United States Patent
Nagano et al.

(10) Patent No.: US 7,101,094 B2
(45) Date of Patent: Sep. 5, 2006

(54) LASER APPARATUS HAVING PROTECTION MEMBER AT LIGHT-EMISSION END OF MULTIMODE OPTICAL FIBER

(75) Inventors: Kazuhiko Nagano, Kaisei-machi (JP); Yoji Okazaki, Kaisei-machi (JP); Teruhiko Kuramachi, Kaisei-machi (JP); Fusao Yamanaka, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 10/670,473

(22) Filed: Sep. 26, 2003

(65) Prior Publication Data
US 2004/0096159 A1    May 20, 2004

(30) Foreign Application Priority Data
Sep. 30, 2002    (JP)    ................... 2002-287299

(51) Int. Cl.
*G02B 6/36* (2006.01)
(52) U.S. Cl. ................. 385/93; 385/53; 385/88; 385/92
(58) Field of Classification Search .......... 385/27, 385/33, 93
See application file for complete search history.

(56) References Cited

U.S. PATENT DOCUMENTS

| 4,398,796 A | * | 8/1983 | Dalgoutte et al. ............ 385/78 |
| 5,187,759 A | * | 2/1993 | DiGiovanni et al. .......... 385/27 |
| 5,392,305 A | | 2/1995 | Jakobson |
| 6,362,919 B1 | * | 3/2002 | Flanders ..................... 359/497 |
| 6,404,786 B1 | | 6/2002 | Kondo et al. |
| 6,718,088 B1 | * | 4/2004 | Okazaki et al. ............... 385/27 |
| 2002/0090172 A1 | | 7/2002 | Okazaki et al. |

FOREIGN PATENT DOCUMENTS

| JP | 11-54852 A | 2/1999 |
| JP | 11-87814 A | 3/1999 |

* cited by examiner

*Primary Examiner*—Jennifer Doan
(74) *Attorney, Agent, or Firm*—Sughrue Mion, PLLC (57) ABSTRACT

In a laser apparatus, a plurality of semiconductor laser elements respectively emit laser beams; a multimode optical fiber has a light-entrance end and a light-emission end; an optical condensing system collects the laser beams emitted from the plurality of semiconductor laser elements, and couples the collected laser beams to the light-entrance end of the multimode optical fiber; and a protection member is arranged at the light-emission end of the multimode optical fiber, protects the light-emission end from the atmosphere, and has a light-emission window located at at least a predetermined distance from the light-emission end.

11 Claims, 6 Drawing Sheets

LASER APPARATUS HAVING PROTECTION MEMBER AT LIGHT-EMISSION END OF MULTIMODE OPTICAL FIBER

BACKGROUND OF THE INVENTION

1. Field of the Invention

The present invention relates to a laser apparatus in which laser beams emitted from a plurality of semiconductor laser elements are collected by an optical condensing system, and are optically multiplexed in an optical fiber.

2. Description of the Related Art

The following documents (1) to (5) disclose information related to the present invention.

(1) Japanese Unexamined Patent Publication No. 2002-202442 (corresponding to U.S. Patent Laid-Open No. 20020090172)

(2) Japanese Unexamined Patent Publication No. 11(1999)-54852

(3) U.S. Pat. No. 5,392,305

(4) Japanese Unexamined Patent Publication No. 11(1999)-167132 (corresponding to U.S. Pat. No. 6,404,786)

(5) Japanese Unexamined Patent Publication No. 11(1999)-87814

Conventionally, in order to generate a laser beam having an ultraviolet wavelength, wavelength conversion lasers, excimer lasers, and Ar lasers are used. In the wavelength conversion lasers, infrared light emitted from a solid-state laser excited with a semiconductor laser is converted into a third harmonic having an ultraviolet wavelength. Further, GaN-based compound semiconductor lasers which emit a laser beam having a wavelength in the vicinity of 400 nm have been provided.

Light sources which emit laser beams having the wavelengths as mentioned above are being considered to be used in exposure systems for exposure of photosensitive materials which are sensitive to light in a predetermined wavelength range including an ultraviolet wavelength range of 350 to 420 nm. In such a case, the light sources for exposure are required to have sufficient output power for exposing the photosensitive materials. The above predetermined wavelength range is hereinafter referred to as the ultraviolet range.

However, the excimer lasers are large in size, and the manufacturing costs and maintenance costs of the excimer lasers are high.

In the wavelength conversion lasers which convert infrared light into a third harmonic in the ultraviolet range, the wavelength conversion efficiency is very low. Therefore, it is very difficult to achieve high output power. In addition, since an optical wavelength conversion element is used in the above wavelength conversion lasers, and the optical wavelength conversion element is expensive, the manufacturing cost of the wavelength conversion laser is high.

Further, the efficiency in electric-to-optical conversion in the Ar lasers is as low as 0.005%, and the lifetime thereof is as short as about 1,000 hours.

On the other hand, since it is difficult to obtain a low-dislocation GaN crystal substrate, an attempt has been made to achieve high output power and reliability in a GaN-based compound semiconductor laser. In the attempt, a low-dislocation region having a width of about 5 micrometers is produced by a growth method called ELOG (epitaxial lateral overgrowth), and a laser region is formed on the low-dislocation region. However, even in the attempt, it is difficult to obtain a low-dislocation substrate having a large area. Therefore, GaN-based compound semiconductor lasers having a high output power of 500 mW to 1 W are yet to be commercialized.

In consideration of the above circumstances, optically-multiplexing laser-light sources which can increase output power have been proposed, for example, as disclosed in aforementioned document (1). In the optically-multiplexing laser-light sources, laser beams emitted from a plurality of semiconductor laser elements are optically multiplexed in a multimode optical fiber.

However, the above optically-multiplexing laser-light sources have a drawback that light-emission end faces of the semiconductor laser elements and optical elements such as lenses and the optical fiber are contaminated with materials (contaminants) remaining in a sealed container, and laser characteristics deteriorate. Typical examples of the contaminants are hydrocarbon compounds. It is known that laser light polymerizes or decomposes the hydrocarbon compounds, and the polymerized or decomposed products adhere to the light-emission end faces and the optical elements, and prevent the increase in the output power.

In addition, for example, aforementioned document (2) discloses that a photochemical reaction between oxygen and low molecular siloxane suspended in air occurs, and reaction products, SiOx, are deposited on an optical glass window element. Therefore, periodic replacement of window elements exposed to air has been recommended, for example, as indicated in document (2).

In order to solve the above problems, for example, aforementioned document (3) has proposed to mix oxygen of 100 ppm or more into sealing gas so that the hydrocarbon compounds and the like are decomposed.

Further, in optical systems in which ultraviolet light having a wavelength of 400 nm or less is applied to optical elements, arrangement of the optical elements in an atmosphere containing nitrogen of 99.9% or more has been proposed, for example, as indicated in aforementioned document (4).

Furthermore, oil removal from and cleaning of the inside of a laser apparatus has been proposed, for example, as indicated in aforementioned document (5).

Nevertheless, in optical systems having an external resonator and generating ultraviolet light as disclosed in document (4), expensive equipment for supplying highly-pure nitrogen is necessary for purging the external resonator with nitrogen of 99.9% or more. Therefore, an increase in the manufacturing cost of the laser apparatus cannot be avoided.

On the other hand, there has been disclosed in Japanese patent application No. 2002-101722 that the laser characteristics of modules having the semiconductor laser elements with an oscillation wavelength of 350 to 450 nm and being contained in a sealed container deteriorate when the oxygen concentration in the sealing atmosphere become too high.

Oxygen-concentration dependence of the aging deterioration rates of laser modules using semiconductor laser elements has been examined, and variations of the reliability of the laser modules with the oxygen concentration in the sealing atmosphere, where the cleaning process as disclosed in the document (5) is performed on the laser modules has been evaluated, and the above examination is performed for different oscillation wavelengths of the semiconductor laser elements, 410 nm, 810 nm, and 980 nm. According to the evaluation, the effect of improving the laser characteristics with increase in the oxygen concentration is not observed in the laser modules using semiconductor laser elements which have the wavelength of 410 nm, while such an effect is observed in the laser modules using semiconductor laser elements which have the infrared wavelengths of 810 nm and 980 nm.

That is, in the case where the semiconductor laser elements in the laser modules have an infrared wavelength of 810 or 980 nm, the decomposing reaction of hydrocarbon-based organic compounds which are deposited on surfaces of optical elements (including a light-entrance end face of an optical fiber and lenses) arranged on the path of laser light is enhanced with increase in the oxygen concentration, and therefore the reliability with the passage of time is increased with increase in the oxygen concentration.

On the other hand, in the case where the semiconductor laser elements in the laser modules have a wavelength of 410 nm, the reliability with the passage of time decreases when the oxygen concentration becomes 100 ppm or more. This is because when the oxygen concentration becomes 100 ppm or more, the amount of silicon compounds deposited on the light-entrance end face of the optical fiber at which the light beams are collected becomes significant. Since the silicon compounds absorb light as well as the hydrocarbon-based organic compounds, the deposited amount of the silicon compounds significantly decreases the aging reliability in continuous oscillation.

That is, the hydrocarbon deposit which is produced by the reaction of hydrocarbon gas with laser light is decomposed into carbon dioxide ($CO_2$) and water ($H_2O$) in an atmosphere containing at least a predetermined amount of oxygen, and is then removed. However, the deposited silicon compounds cannot be decomposed or removed by merely mixing oxygen into the atmosphere. The deposited silicon compounds are produced by a photochemical reaction of gas of an organic compound containing the silicon atom with laser light. For example, the organic compound contains a siloxane (Si—O—Si) bond or a silanol (—Si—OH) radical. When oxygen is contained in the atmosphere, the above photochemical reaction is accelerated. Hereinafter, the organic compound containing the silicon atom is referred to as the organic silicon compound.

The silicon compounds considered in this specification are organic and inorganic compounds having any structures which contain the silicon atom. The silicon compounds include inorganic silicon oxides (SiOx), organic silicon compounds, silicon-carbide compounds, and organic silicon-carbide compounds. In addition, silicon-based materials which are used at arbitrary places during manufacture of each laser module emit gas of organic silicon compounds. When a silicon-based material adheres to a surface of an element in the laser module, and the element is sealed in the laser module for use, a very small amount of organic silicon compound gas is emitted into the sealed atmosphere.

It is impossible to completely remove the gas component which exists during the manufacturing process, by merely providing equipment for purifying the sealing gas in a conventional clean room. In order to remove the gas component, an enormous amount of equipment investment is required. In addition, even when the process for oil removal from and cleaning of the inside of the laser module is performed as disclosed in aforementioned document (5), it is impossible to prevent mixture of organic silicon compound gas into an atmosphere during a manufacturing process.

As described above, even in the case where oxygen is contained in the sealing atmosphere in order to prevent accumulation of hydrocarbon compounds, when the oxygen content becomes too great, the deposited amount of silicon compounds increases, and the laser characteristics deteriorate. Further, since the end portion of the optical fiber and other optical elements including lenses are fixed to the inside of each laser module with an adhesive or brazing material, it is impossible to periodically replace the optical elements as disclosed in aforementioned document (2).

It is considered that the output power and light intensity of laser apparatuses will be further increased in the future as in the optically-multiplexing laser-light sources. In particular, in laser apparatus which output a high-energy laser light in the ultraviolet range, the power density increases at the light-emission end face of the optical fiber as well as the light-emission end faces of the plurality of semiconductor laser elements, the light-entrance end face of the optical fiber, and the other optical elements. Therefore, the organic compounds are likely to be decomposed, and contaminants such as decomposition products and dust in the atmosphere are likely to adhere to the above-mentioned end faces and optical elements.

SUMMARY OF THE INVENTION

The present invention has been developed in view of the above circumstances.

The object of the present invention is to provide a laser apparatus which can be produced at low cost, and has high output power and high reliability.

In order to accomplish the above object, the present invention is provided. According to the present invention, there is provided a laser apparatus comprising: a plurality of semiconductor laser elements which emit laser beams, respectively: a multimode optical fiber which has a light-entrance end and a light-emission end; an optical condensing system which collects the laser beams emitted from the plurality of semiconductor laser elements, and couples the collected laser beams to the light-entrance end of the multimode optical fiber; and a protection member which is arranged at the light-emission end of the multimode optical fiber, protects the light-emission end from an atmosphere, and has a light-emission window located at at least a predetermined distance from the light-emission end.

In the laser apparatus according to the present invention having the above construction, the protection member protecting the light-emission end from the atmosphere and having a light-emission window located at at least a predetermined distance from the light-emission end of the multimode optical fiber is arranged at the light-emission end of the multimode optical fiber. Therefore, it is possible to protect adhesion of contaminants to the light-emission end of the multimode optical fiber. Thus, the light output power and reliability can be increased at low cost.

Preferably, the laser apparatus according to the present invention may also have one or any possible combination of the following additional features (i) to (xiii).

(i) The protection member is made of a transparent material, and comprises a first face fixed to the light-emission end of the multimode optical fiber and a second face being located opposite to the first face and realizing the light-emission window. In this case, the face from which a laser beam is output to the atmosphere (i.e., the light-emission window of the protection member) is a face opposite to and separated from the light-emission end face of the multimode optical fiber. Therefore, the power density at the light-emission window is low, and thus adhesion of contaminants to the light-emission window can be prevented. Further, since the low power density at the light-emission window lowers the capability of decomposition of organic materials in the vicinity of the light-emission window, adhesion of decomposition products to the light-emission window can also be prevented.

(ii) The protection member is a sealed container which is fixed to the multimode optical fiber in a vicinity of the light-emission end of the multimode optical fiber so that the sealed container contains the light-emission end, the container having a glass window being located opposite to the light-emission end to realize the light-emission window, and inert gas being sealed in the container. In this case, for a similar reason to that in the laser apparatus having the feature (i), the power density at the light-emission window is low, and adhesion of contaminants to the light-emission window can be prevented. In addition, since the inert gas is sealed in the container, it is possible to prevent adhesion of contaminants to the surfaces of the optical elements exposed in the container.

(iii) The protection member is a sealed container which is fixed to the multimode optical fiber in a vicinity of the light-emission end of the multimode optical fiber, the sealed container having an inlet port, an outlet port, and a glass window, the inlet port and the outlet port being connected to a gas circulation system for circulating inert gas through the sealed container, and the glass window being located opposite to the light-emission end to realize the light-emission window. In this case, for a similar reason to that in the laser apparatus having the feature (i) or (ii), the power density at the light-emission window is low, and adhesion of contaminants to the light-emission window can be prevented. In addition, since the inert gas always exists around the light-emission end face of the multimode optical fiber, it is possible to satisfactorily prevent adhesion of contaminants to the light-emission end face of the multimode optical fiber. Further, since the aforementioned equipment for supplying highly pure nitrogen is not necessary, it is possible to produce at low cost a laser apparatus which has high reliability and high output power.

(iv) In the laser apparatus having the feature (iii), the gas circulation system comprises a filter for removing contaminants contained in gas discharged from the outlet port. In this case, it is possible to satisfactorily remove contaminants which are produced in the sealed container and the gas circulation system. Therefore, it is possible to further increase the reliability and output power of the laser apparatus.

(v) In the laser apparatus having the feature (ii), (iii), or (iv), the inert gas is inert against constituents of the laser apparatus, and is, for example, dry nitrogen or a rare gas such as argon.

(vi) In the laser apparatus having the feature (ii), (iii), or (iv), oxygen of at least 1 ppm and at least one of halogen gas and halide gas are mixed into the inert gas. In this case, hydrocarbon deposits are decomposed by oxidation and decrease. In addition, deposits produced from silicon compounds can be decomposed by the halogen or halide gas and removed, i.e., the deposits produced from silicon compounds decrease. Therefore, deterioration of the laser characteristics can be effectively suppressed. Thus, it is possible to realize a laser apparatus having high reliability.

(vii) In the laser apparatus having the feature (vi), the concentration of the oxygen is 1 to 100 ppm.

(viii) In the laser apparatus having the feature (vi), the at least one of halogen gas and halide gas contains the fluorine atom.

(ix) In the laser apparatus having the feature (vi), the halide gas is composed of at least one of fluorides and chlorides of carbon, nitrogen, sulfur, and xenon.

(x) In the laser apparatus having the feature (vi), the light-emission end of the multimode optical fiber and the inner surface of the light-emission window which are sealed in the container are each made of at least one material which is inert against the halogen gas and the halide gas. In this case, deterioration of the light-emission end of the multimode optical fiber and the inner surface of the light-emission window can be effectively prevented, since the halogen gas and the halide gas are highly reactive.

(xi) In the laser apparatus having the feature (x), the at least one inert material is at least one of oxides of indium, gallium, aluminum, titanium, and tantalum and nitrides of gallium, aluminum, titanium, and tantalum.

(xii) The multimode optical fiber has a core diameter of 100 micrometers or smaller at the light-emission end. Since the power density at the light-emission end is high when the core diameter at the light-emission end of the multimode optical fiber is 100 micrometers or smaller, the present invention is very effective for preventing adhesion of contaminants.

(xiii) The plurality of semiconductor laser elements are made of GaN-based compound semiconductor materials. Since the GaN-based compound semiconductor laser elements emit high-energy laser beams in the ultraviolet wavelength range, the present invention is very effective for preventing adhesion of contaminants.

DESCRIPTION OF PREFERRED EMBODIMENTS

Embodiments of the present invention are explained in detail below with reference to drawings.

First Embodiment

Figure 1:
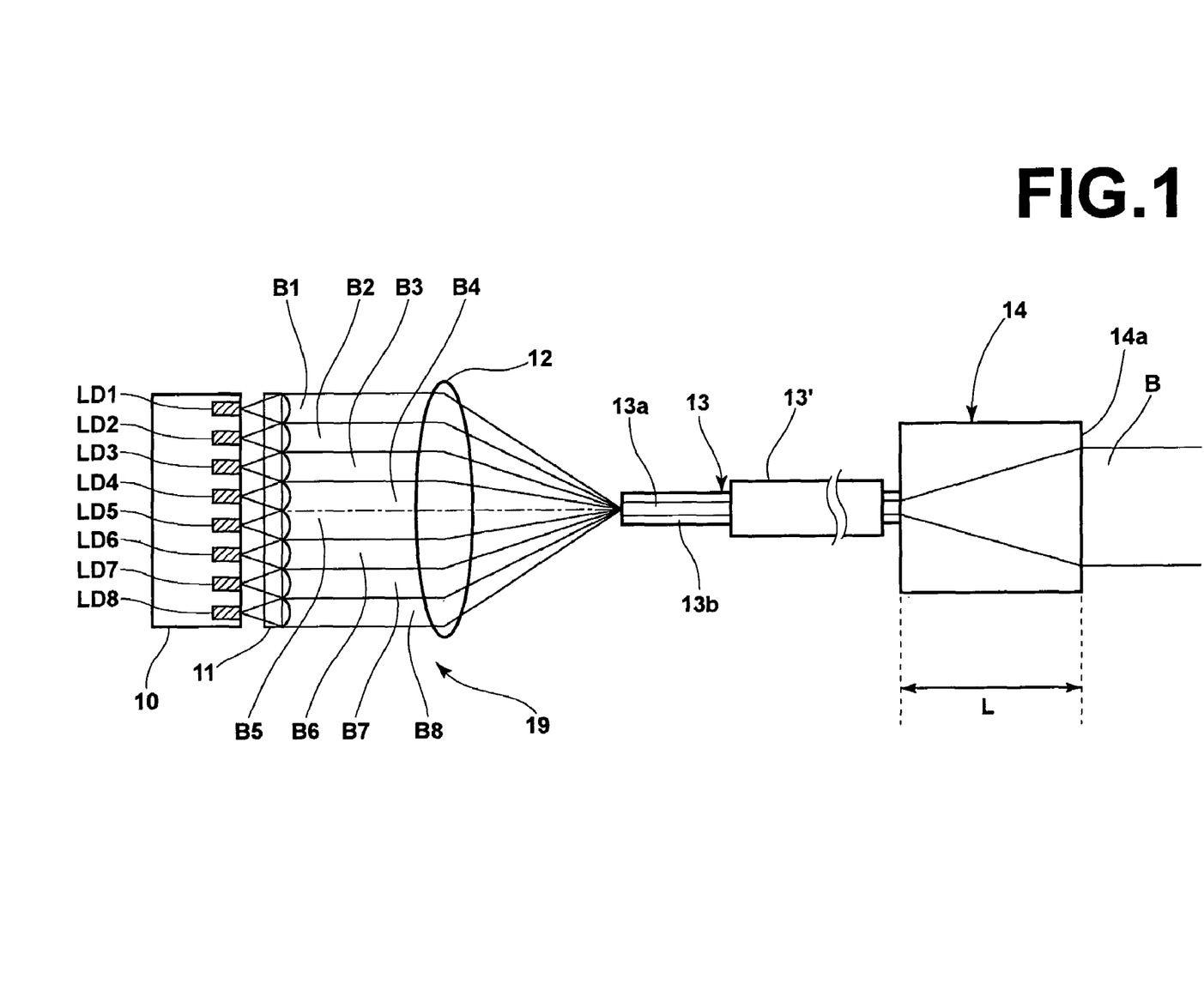
FIG. 1 is a diagram illustrating an outline of a laser apparatus according to a first embodiment of the present invention.
Figure 2:
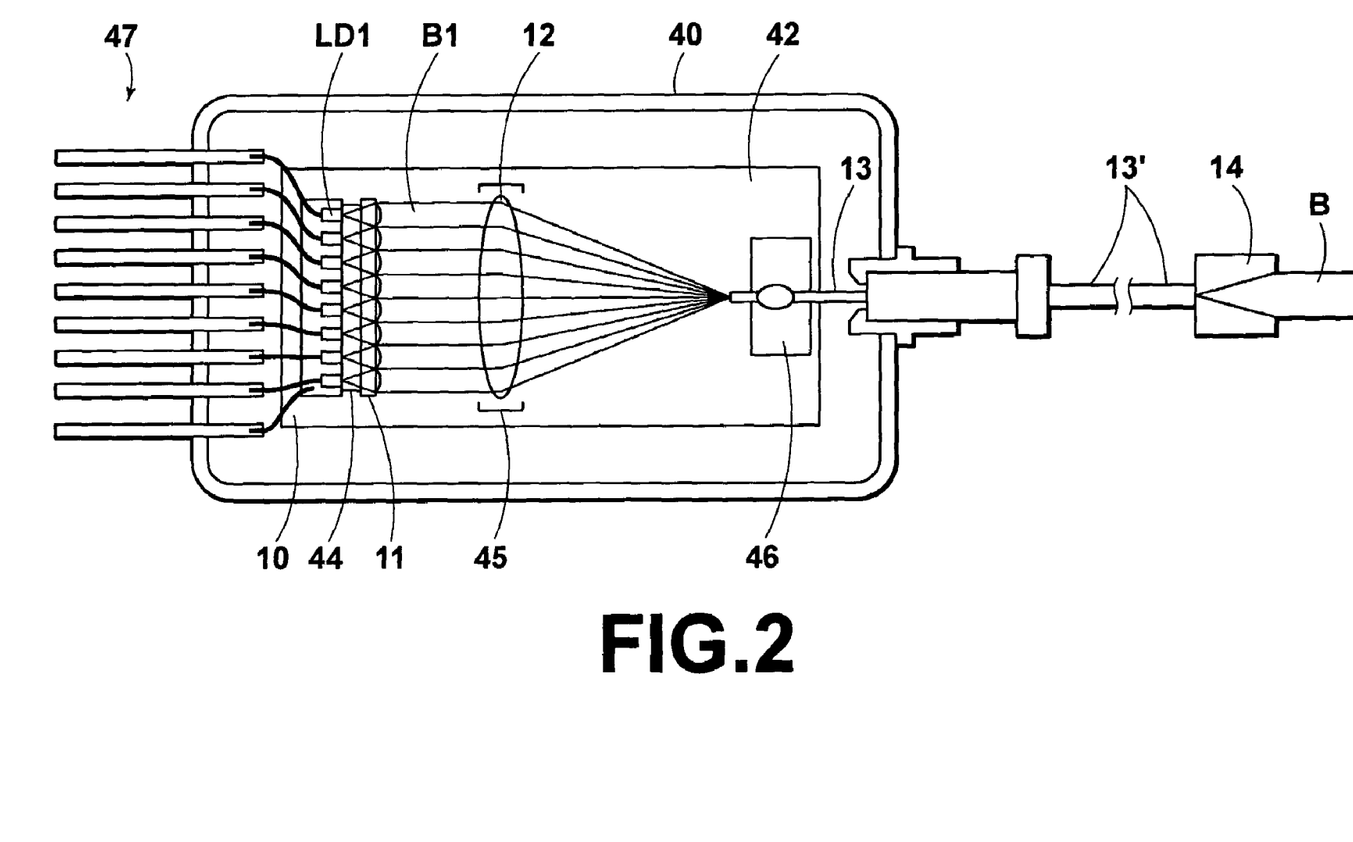
FIG. 2 is a plan view of a laser module in which the laser apparatus according to the first embodiment is packaged.
Figure 3:
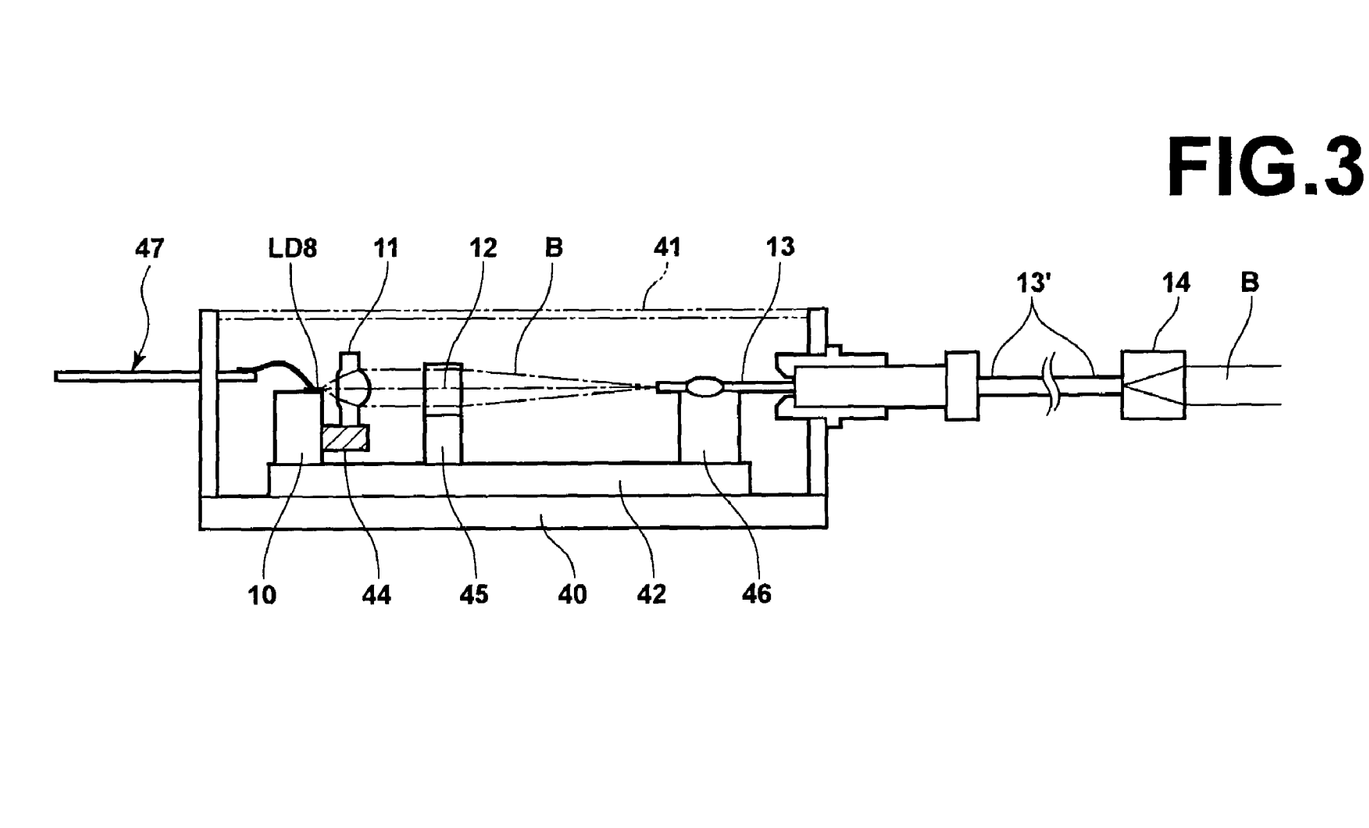
FIG. 3 is a side view of the laser module in which the laser apparatus according to the first embodiment is packaged.

FIG. 1 is a diagram illustrating an outline of a laser apparatus according to the first embodiment of the present invention, and FIGS. 2 and 3 are schematic plan and side views of a module containing the laser apparatus of FIG. 1.

The laser apparatus of FIG. 1 is constituted by a heat block (heat-dissipation block) 10, GaN-based semiconductor laser chips LD1 through LD8, a collimator-lens array (microlens array) 11, a condensing lens 12, a multimode optical fiber 13, and a glass element 14.

The heat block 10 is made of copper or a copper alloy. The GaN-based semiconductor laser chips LD1 through LD8 are fixed on the heat block 10, and each of the GaN-based semiconductor laser chips LD1 through LD8 has a single cavity, and operates in a single transverse mode. The glass element 14 has a shape of a rectangular parallelopiped with a thickness L of about 2 mm, and is fixed to a light-emission end of the multimode optical fiber 13 by fusion.

Note that FIG. 1 shows only a basic construction of the laser apparatus according to the first embodiment. In particular, the shapes of the collimator-lens array 11 and the condensing lens 12 are schematically shown. In addition, it is possible to mount each of the GaN-based semiconductor laser chips LD1 through LD8 on a submount made of, for example, AlN, and fix the submount on the heat block 10.

The GaN-based semiconductor laser chips LD1 to LD8 each have an identical oscillation wavelength of 400 nm and an identical output power of 50 mW. Divergent laser beams B1 to B8 emitted from the GaN-based semiconductor laser chips LD1 to LD8 are respectively collimated by lenses constituting the collimator-lens array 11. Then, the collimated laser beams B1 to B8 are collected by the condensing lens 12, and converge on a light-entrance end face of a core 13a of the multimode optical fiber 13. In this example, an optical condensing system 19 is constituted by the collimator-lens array 11 and the condensing lens 12, and an optical multiplex system is constituted by the optical condensing system 19 and the multimode optical fiber 13. Thus, the laser beams B1 to B8, collected by the condensing lens 12 as described above, enter and propagate in the core 13a of the multimode optical fiber 13, in which the laser beams B1 to B8 are optically multiplexed into a single laser beam B. Finally, the laser beam B is output from a light-emission end face 14a of the glass element 14, which is fixed to the multimode optical fiber 13 by fusion.

The multimode optical fiber 13 is constituted by the core 13a and a cladding 13b surrounding the core 13a, and the multimode optical fiber 13 is covered with resin. In FIGS. 1 to 3, the resin-covered multimode optical fiber is indicated by reference number 13'. Further, the multimode optical fiber 13 may be a step-index type, a graded-index type, or any combination thereof.

Furthermore, the glass element 14 may be replaced with a similar element made of a plastic material or any other transparent material, instead of glass.

Next, a laser module in which the laser apparatus according to the first embodiment is packaged is explained. FIGS. 2 and 3 are schematic plan and side views of the laser module in which the laser apparatus according to the first embodiment is packaged.

As illustrated in FIGS. 2 and 3, the GaN-based semiconductor laser chips LD1 through LD8, the collimator-lens array 11, the condensing lens 12, and the light-entrance end of the multimode optical fiber 13 are contained in a box type package 40. When the package 40 has an opening on its upper side, and the opening is closed with a cover 41, the GaN-based semiconductor laser chips LD1 through LD8, the collimator-lens array 11, the condensing lens 12, and the light-entrance end of the multimode optical fiber 13 are hermetically sealed in the closed space realized by the package 40 and the cover 41. In FIG. 2, in order to simplify the illustration, the reference numbers of the GaN-based semiconductor laser chips LD2 to LD8 and the laser beams B2 through B8 are not shown.

A base plate 42 is fixed on the inner bottom surface of the package 40, the aforementioned heat block 10 is fixed on the upper surface of the base plate 42, and a collimator-lens holder 44 for holding the collimator-lens array 11 is fixed to the heat block 10. In addition, a condensing-lens holder 45 for holding the condensing lens 12 and a fiber holder 46 for holding the light-entrance end of the multimode optical fiber 13 are fixed to the upper surface of the base plate 42. Further, wirings 47 for supplying driving currents to the GaN-based semiconductor laser chips LD1 through LD8 are led out of the package 40 through openings formed in a sidewall of the package 40.

For example, each of the GaN-based semiconductor laser chips LD1 to LD8 has an emission width of about one micrometer, a spread angle of 10 degrees in the direction parallel to the active layer of the GaN-based semiconductor laser chip, and a spread angle of 30 degrees in the direction perpendicular to the active layer. In addition, the light emission points of the GaN-based semiconductor laser chips LD1 to LD8 are arranged along a line parallel to the active layers of the GaN-based semiconductor laser chips LD1 to LD8.

When the numerical aperture (NA) of each lens constituting the microlens array 11 is 0.2, and the angle a of convergence of each of the collimated laser beams B1 to B8 by the condenser lens 12 is 11 degrees, the diameter of a convergence spot on the core 13a on which each of the collimated laser beams B1 to B8 converges becomes about 18 micrometers. In addition, when the output power of each of the GaN-based semiconductor laser chips LD1 to LDB is 50 mW, the output power of the optically multiplexed laser beam B becomes 400 mW.

The multimode optical fiber 13 is formed by using the step-index type optical fiber manufactured by Mitsubishi Cable Industries, Ltd as its base. The multimode optical fiber 13 has a core diameter of 50 micrometers and a numerical aperture (NA) of 0.2, and the transmittance of the end face coating is 99.5% or greater. In this example, the core diameter multiplied by the NA is 10 micrometers.

In addition, since the thickness L of the glass element 14 is about 2 mm, and the spread angle of the laser beam B in the interval between the light-emission end face of the multimode optical fiber 13 and the light-emission end face 14a of the glass element 14 is 16.5 degrees, the diameter of the laser beam at the light-emission end face 14a of the glass element 14 becomes as large as about 1.2 mm, and the power density at the light-emission end face 14a is about one-thousandth lower than the power density at the light-emission end face of the multimode optical fiber 13.

Figure 4:
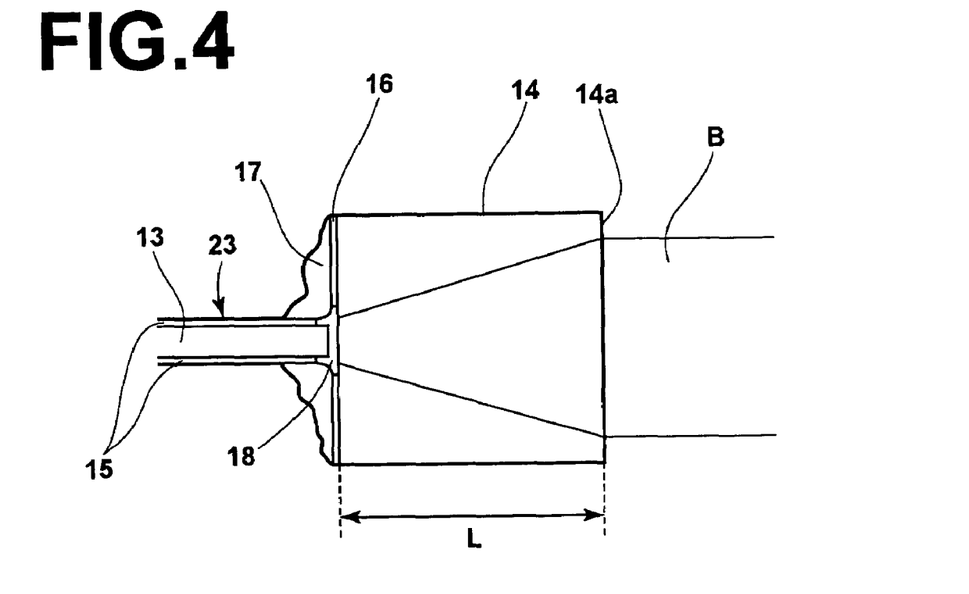
FIG. 4 is a cross-sectional view of an alternative construction in which a glass element is bonded to a light-emission end of a multimode optical fiber.

Although, in the above embodiment, the glass element 14 is fixed to the light-emission end face of the multimode optical fiber 13 by fusion, alternatively, it is possible to couple the glass element 14 to the multimode optical fiber 13 as illustrated in FIG. 4. In this case, the circumference of a portion 23 of the multimode optical fiber 13 in a vicinity of its light-emission end face is metalized with metal 15, a fixation area of the fiber-side surface of the glass element 14 located around a light-entrance area of the fiber-side surface of the glass element 14 is also metalized with metal 16, and then the metalized portion 23 of the multimode optical fiber 13 is fixed to the metalized fixation area of the glass element 14 with solder 17. At this time, in order to prevent reflection due to an air layer formed by the metal portions 15 and 16, and increase the beam transmittance, an end-face coating 18 is applied to each of the light-emission end face of the multimode optical fiber 13 and the light-entrance area of the glass element 14 so that the light-emission end face of the multimode optical fiber 13 and the light-entrance area of the glass element 14 cause substantially no reflection at the oscillation wavelength of the laser beam B.

Second Embodiment

Figure 5:
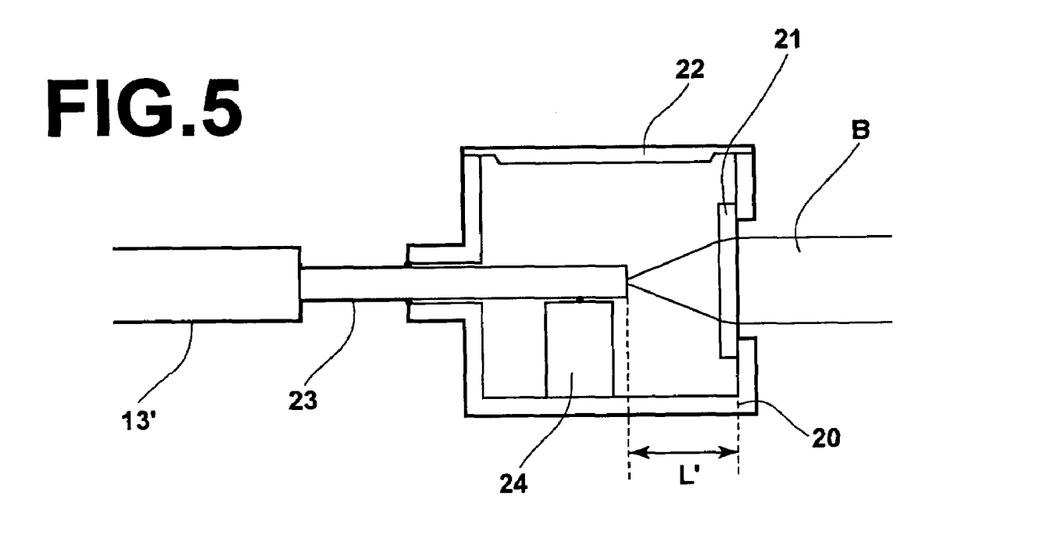
FIG. 5 is a side view of a protection member in a laser apparatus according to a second embodiment of the present invention.

Next, the laser apparatus according to the second embodiment of the present invention will be explained below. The laser apparatus according to the second embodiment is different from the first embodiment in only the protection member which is arranged in a vicinity of a light-emission end face of a multimode optical fiber. Therefore, the explanations on the semiconductor laser elements, the optical condensing system, and the optical multiplex system are not repeated here unless necessary. FIG. 5 is a side view of the protection member in the laser apparatus according to the second embodiment.

As in the first embodiment, the multimode optical fiber is constituted by a core and a cladding surrounding the core, and the multimode optical fiber is covered with resin. In FIG. 5, the resin-covered multimode optical fiber is indicated by reference numeral 13'. In addition, as in the alternative construction of the first embodiment, the circumference of a portion 23 of the multimode optical fiber in a vicinity of its light-emission end is metalized.

As illustrated in FIG. 5, the metalized portion 23 of the multimode optical fiber is fixed on a holder 24 in a package 20, which has a glass window 21 as a light-emission window. The package is purged with inert gas, and is then metal-sealed with a cover 22.

The distance L' between the light-emission end face of the multimode optical fiber and the light-emission end face of the glass window 21 is about 2 mm. Therefore, the power density at the light-emission end face of the glass window 21 is about one-thousandth lower than the power density at the light-emission end face of the multimode optical fiber.

A preferable inert gas with which the package 20 is filled contains nitrogen having a purity of 99.9%, and oxygen of at least 1 ppm and at least one of halogen gas and halide gas are mixed into the inert gas. When oxygen of at least 1 ppm is contained in the sealed atmosphere, deterioration of the laser module can be suppressed. This is because the oxygen contained in the sealed atmosphere oxidizes and decomposes solid materials generated by photodecomposition of hydrocarbon components. However, when the oxygen concentration is less than 1 ppm, the effect of suppressing the deterioration cannot be obtained. On the other hand, when oxygen concentration is too high, photochemical reaction of organic silicon compound gas is accelerated. Therefore, preferably, the oxygen concentration in the sealed atmosphere is 1 to 800 ppm, and more preferably 1 to 100 ppm.

The halogen gas includes chlorine ($Cl_2$) gas, fluorine ($F_2$) gas, and the like, and the halide gas are gaseous compounds containing the halogen atom such as chlorine (Cl), bromine (Br), iodine (I), or fluorine (F).

The halide gas includes $CF_3Cl$, $CF_2Cl_2$, $CFCl_3$, $CF_3Br$, $CCl_4$, $CCl_4$—$O_2$, $C_2F_4Cl_2$, $Cl$—$H_2$, $PCl_3$, $CF_4$, $SF_6$, $NF_3$, $XeF_2$, $C_3F_8$, $CHF_3$, and the like. Compounds of fluorine or chlorine with carbon (C), nitrogen (N), sulfur (S), or xenon (Xe) are preferable for use in the present invention, and compounds containing the fluorine atom are particularly preferable.

Although inclusion of even a very small amount of halogen or halide gas produces the effect of suppressing the deterioration of the laser module, in order to make the effect remarkable, it is preferable that the concentration of halogen or halide gas in the sealed atmosphere is 1 ppm or more. The inclusion of halogen or halide gas in the sealed atmosphere suppresses the deterioration of the laser module since the halogen or halide gas in the sealed atmosphere decomposes materials deposited by photodecomposition of organic silicon compound gas.

If exposed surfaces of the optical elements are made of a material which is reactive with halogen or halide gas, such as an oxide or nitride of silicon (Si), molybdenum (Mo), chromium (Cr), tin (Sn), or zirconium (Zr), the exposed surfaces are etched, and the reliability of the laser module decreases.

Therefore, it is preferable that each of the exposed surface of the light-emission end face of the multimode optical fiber and the fiber-side surface of the light-emission window is made of a material which is inert with respect to halogen or halide gas, such as an oxide or nitride of indium (In), gallium (Ga), aluminum (Al), or titanium (Ti), or tantalum (Ta).

Third Embodiment

Figure 6:
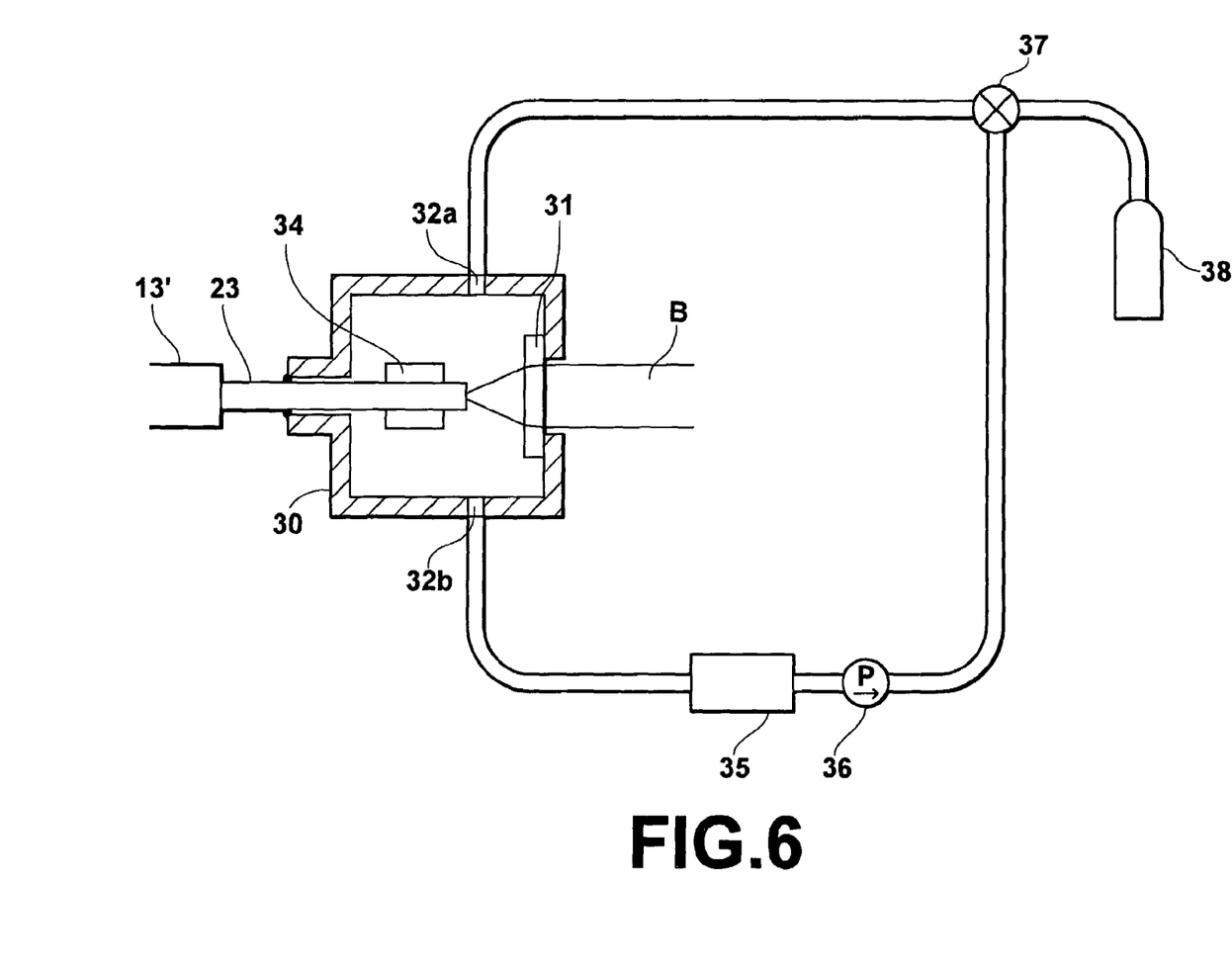
FIG. 6 is a plan view of a protection member in a laser apparatus according to a second embodiment of the present invention.

Next, the laser apparatus according to the third embodiment of the present invention will be explained below. The laser apparatus according to the third embodiment is different from the first embodiment in only the protection member which is arranged in a vicinity of a light-emission end of a multimode optical fiber. Therefore, the explanations on the semiconductor laser elements, the optical condensing system, and the optical multiplex system are not repeated here unless necessary. FIG. 6 is a plan view of the protection member in the laser apparatus according to the third embodiment of the present invention.

As illustrated in FIG. 6, a metalized portion 23 of the multimode optical fiber is fixed on a holder 34 in a package 30, which has a glass window 31 as a light-emission window. The package 30 has a gas inlet 32a and a gas outlet 32b. In addition, a gas circulation system comprising a filter 35, a pump 36, a valve 37, and a gas cylinder 38 is provided. The filter 35 is arranged in a pipe led out from the gas outlet 32b, and provided for removing contaminants from inert gas discharged from the gas outlet 32b. The pump 36 makes inert gas circulate through the package 30. The valve 37 is provided for controlling addition of inert gas from the gas cylinder 38. The package 30 is metal-sealed with a cover (not shown).

It is preferable that the filter 35 is filled with an absorbent. For example, zeolite absorbent, activated carbon, or both of the zeolite absorbent and activated carbon can be used as the absorbent. A preferable example of the zeolite absorbent is Zeolum, type F9, grade HA, manufactured by Tosoh Corporation, Japan, where Zeolum is a registered trademark of Tosoh Corporation. Zeolum, F9, HA, is made of a crystalline, hydrated aluminosilicate of an alkali metal or alkali earth metal, $Me_{2/X} \cdot Al_2O_3 \cdot mSiO_2 \cdot nH_2O$, where Me is an m-valent metal ion, and m is an integer. It is preferable that the amount of the zeolite absorbent is determined based on the volume of the package, estimated types of contaminants, the absorption capability of the absorbent, and the like. Alternatively, any absorbent other than the zeolite absorbent can also be used.

Further, it is possible to add a catalyst such as platinum (Pt) or palladium (Pd) to the filter which is filled with the absorbent, and heat the filter to 500° C. so as to decompose hydrocarbons.

Although, in the third embodiment, the contaminants are removed by arranging the filter in a pipe constituting the gas circulation system, alternatively, it is possible to fix an absorbent to a place in the package 30 with an inorganic or organic adhesive so as to remove contaminants, where the absorbent is fixed to such a place that the absorbent does not obstruct the laser beam.

Since, in the third embodiment, the end face from which the laser beam B is emitted to the atmosphere is the external surface of the light-emission window 31, which is separated from the light-emission end face of the multimode optical fiber, the power density at the end face from which the laser beam B is emitted to the atmosphere can be reduced. In addition, the power density at the external surface of the light-emission window 31 can be adjusted by adjusting the distance between the light-emission end face of the multimode optical fiber and the external surface of the light-emission window 31.

Fourth Embodiment

Figure 7:
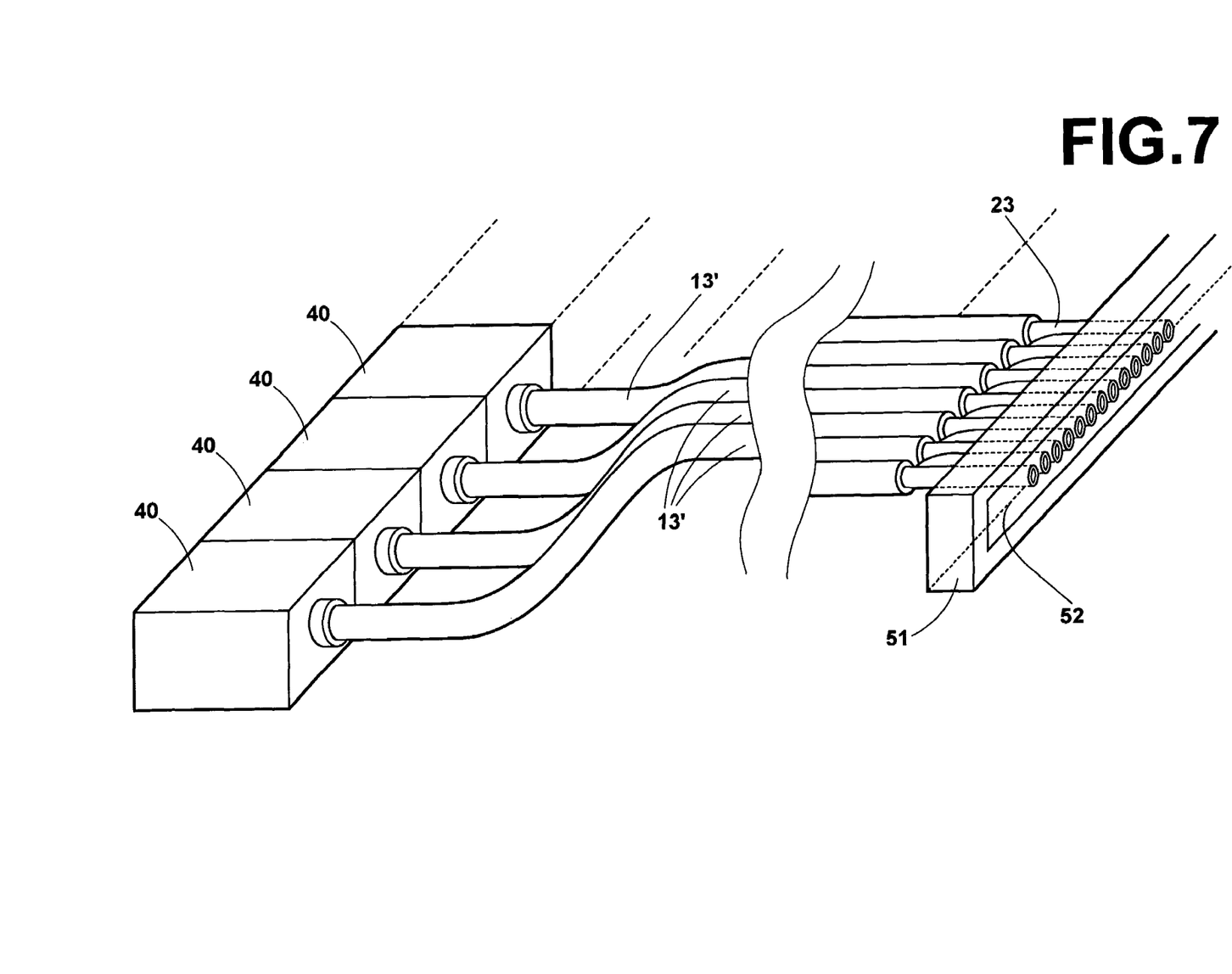
FIG. 7 is a perspective view of a laser apparatus according to a fourth embodiment of the present invention.

Next, the laser apparatus according to the fourth embodiment of the present invention will be explained below. FIG. 7 is a schematic perspective view of the laser apparatus according to the fourth embodiment of the present invention.

As illustrated in FIG. 7, the laser apparatus according to the fourth embodiment comprises a hundred laser units. In each of the laser units, GaN-based semiconductor laser chips LD1 through LD8, a microlens array 11, a condensing lens 12, and a light-entrance end of a resin-covered multimode optical fiber 13' are contained in a package 40. Each of the resin-covered multimode optical fibers 13' has a construction in which a multimode optical fiber constituted by a core and a cladding is covered with resin. The resin-covered multimode optical fibers 13' are led out from the packages 40 of the laser units, respectively.

The circumference of a portion 23 of the multimode optical fiber in each of the multimode optical fibers 13' in a vicinity of its light-emission end is metalized, instead of being covered with resin, and the light-emission ends of the multimode optical fibers 13' are linearly arranged and sealed in a package 51. The package 51 has a cross section similar to the protection member illustrated in FIG. 5, and is elongated in the direction in which the light-emission ends of the multimode optical fibers 13' are arranged. The package 51 has a glass window 52, and is metal-sealed in an inert-gas atmosphere. The light-emission ends of the multimode optical fibers 13' are arranged in the package 51 so as to be located at at least a predetermined distance from the glass window 52. Thus, a protection member for protecting the light-emission end faces of the multimode optical fibers 13' from the atmosphere is realized.

In the above construction, a high-intensity, high-density ultraviolet laser beam B is emitted from each of the multimode optical fibers 13'. Due to the protection member, the power density at the external surface of the glass window 52 can be reduced as in the first to third embodiments. Therefore, adhesion of contaminants can be satisfactorily prevented.

Although, in the fourth embodiment, the light-emission ends of the multimode optical fibers 13' are hermetically sealed with inert gas, alternatively, it is possible to fix an element made of a transparent material such as glass or plastic to the light-emission end face of each of the multimode optical fibers 13' by fusion as in the first embodiment, or seal the light-emission ends of the multimode optical fibers 13' in a container having a gas inlet and a gas outlet which are connected to a gas circulation system so as to make inert gas circulate through the container as in the third embodiment. The inert gas can have composition as explained before.

Additional Matter

All of the contents of the Japanese patent application No. 2002-287299 are incorporated into this specification by reference.

What is claimed is:

1. A laser apparatus comprising:
   a plurality of semiconductor laser elements which emit laser beams, respectively;
   a multimode optical fiber which has a light-entrance end and a light-emission end;
   an optical condensing system which collects the laser beams emitted from said plurality of semiconductor laser elements, and couples the collected laser beams to said light-entrance end of said multimode optical fiber; and
   a protection member which is arranged at said light-emission end of the multimode optical fiber, protects the light-emission end from an atmosphere, and has a light-emission window located at at least a predetermined distance from the light-emission end.

2. A laser apparatus according to claim 1, wherein said protection member is made of a transparent material, and comprises a first face fixed to said light-emission end of said multimode optical fiber and a second face being located opposite to the first face and realizing said light-emission window.

3. The laser apparatus of claim 2 wherein a thickness of the transparent material is greater than or equal to 2 mm.

4. A laser apparatus according to claim 1, wherein said protection member is a sealed container which is fixed to said multimode optical fiber in a vicinity of said light-emission end so that the sealed container contains the light-emission end, said sealed container having a glass window being located opposite to the light-emission end to realize said light-emission window, and inert gas being sealed in the container.

5. A laser apparatus according to claim 1, wherein said protection member is a sealed container which is fixed to said multimode optical fiber in a vicinity of said light-emission end, said sealed container having an inlet port, an outlet port, and a glass window, the inlet port and the outlet port being connected to a gas circulation system for circulating inert gas through the sealed container, and the glass window being located opposite to the light-emission end to realize said light-emission window.

6. A laser apparatus according to claim 5, wherein said gas circulation system comprises a filter removing contaminants contained in gas discharged from said outlet ports.

7. A laser apparatus according to claim 1, wherein said multimode optical fiber has a core diameter of 100 micrometers or smaller at said light emission end.

8. A laser apparatus according to claim 1, wherein said plurality of semiconductor laser elements are made of GaN-based compound semiconductor materials.

9. The laser apparatus of claim 1, wherein the plurality of semiconductor laser elements comprise plural laser diodes mounted to a common heat dissipating substrate.

10. The laser apparatus of claim 1, wherein the predetermined distance is a distance sufficient to reduce a density of light at the light-emission window to less than or equal to approximately $1/1000$ of a density of light at the light emission end.

11. The laser apparatus of claim 1 wherein the light-emission end of the multimode optical fiber lies outside of a housing package.

* * * * *